US012717471B2

(12) United States Patent
Zhao et al.

(10) Patent No.: US 12,717,471 B2
(45) Date of Patent: Aug. 25, 2026

(54) DISPLAY METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Xiang Zhao, Dongguan (CN); Xiaoliang Cao, Dongguan (CN); Min Hu, Dongguan (CN); Fenghua Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/870,987

(22) PCT Filed: Nov. 18, 2022

(86) PCT No.: PCT/CN2022/132941
§ 371 (c)(1),
(2) Date: Dec. 2, 2024

(87) PCT Pub. No.: WO2023/124634
PCT Pub. Date: Jul. 6, 2023

(65) Prior Publication Data

US 2025/0328236 A1 Oct. 23, 2025

(30) Foreign Application Priority Data

Dec. 29, 2021 (CN) ......................... 202111642283.6

(51) Int. Cl.
*G06F 3/0488* (2022.01)
*G06F 1/16* (2006.01)
(Continued)

(52) U.S. Cl.
CPC ............ *G06F 3/0488* (2013.01); *G06F 1/163* (2013.01); *G06F 1/3265* (2013.01); *G06F 3/1423* (2013.01)

(58) Field of Classification Search
CPC ...... G06F 3/0488; G06F 3/1423; G06F 1/163; G06F 1/3265
(Continued)

(56) References Cited

U.S. PATENT DOCUMENTS 11,416,205 B2 * 8/2022 Sepulveda .......... G06F 3/04883
2019/0114204 A1 * 4/2019 Lindman ............... G06F 9/4856
(Continued)

FOREIGN PATENT DOCUMENTS

CN 103688304 A 3/2014
CN 106775976 A 5/2017
(Continued)

OTHER PUBLICATIONS

International Search Report,International Application No. PCT/CN2022/132941, International mailed Jan. 28, 2023 (8 pages).
(Continued)

*Primary Examiner* — Kwin Xie
(74) *Attorney, Agent, or Firm* — Ladas & Parry LLP

(57) ABSTRACT

A display method, an electronic device, and a computer-readable storage medium relate to the technical field of electronic devices. The method is applied to an electronic device including a first system and a second system. The method includes: the first system controlling a screen of the electronic device to display a dynamic interface; and in response to the first system being switched to the second system, the second system controlling the screen of the electronic device to display a static preview image corresponding to the dynamic interface.

16 Claims, 5 Drawing Sheets

(51) Int. Cl.
*G06F 1/3234* (2019.01)
*G06F 3/14* (2006.01)

(58) Field of Classification Search
USPC .................................................. 345/173–174
See application file for complete search history.

(56) References Cited

U.S. PATENT DOCUMENTS

| | | | | |
|---|---|---|---|---|
| 2021/0397815 | A1* | 12/2021 | Alameh .................. | G06F 3/017 |
| 2024/0406540 | A1* | 12/2024 | Dong .................... | G06F 3/0488 |

FOREIGN PATENT DOCUMENTS

| | | | | |
|---|---|---|---|---|
| CN | 111258663 A | | 6/2020 | |
| CN | 112783274 A | | 5/2021 | |
| CN | 112860428 A | | 5/2021 | |
| CN | 112987986 A | | 6/2021 | |
| KR | 20210001288 A | | 1/2021 | |
| WO | WO-2016196693 A1 | * | 12/2016 | ......... G10L 15/1815 |

OTHER PUBLICATIONS

Written Opinion,International Application No. PCT/CN2022/132941, International mailed Jan. 28, 2023 (8 pages).

First Office Action, Chinese Application No. 202111642283.6, mailed May 20, 2026 (16 pages).

* cited by examiner

DISPLAY METHOD, ELECTRONIC DEVICE, AND STORAGE MEDIUM

CROSS REFERENCE TO RELATED APPLICATIONS

The present disclosure is a 35 U.S.C. § 371 National Phase conversion of International (PCT) Patent Application No. PCT/CN2022/132941, filed on Nov. 18, 2022, which claims priority to Chinese patent application No. 202111642283.6, filed on Dec. 29, 2021, the entire contents of which are incorporated herein by reference.

TECHNICAL FIELD

The present disclosure relates to the field of electronic devices, and in particular to a display method, an electronic device, and a computer-readable storage medium.

BACKGROUND

With the rapid development of smart device technologies and the gradual enrichment of smart device functions, more and more electronic devices are configured with dual systems. However, the electronic devices configured with dual systems consume a large amount of power when displaying, resulting in poor battery life and affecting user experience.

SUMMARY

In a first aspect, the present disclosure provides a display method applied to an electronic device. The electronic device includes a first system and a second system. The method includes: controlling, by the first system, a screen of the electronic device to display a dynamic interface; and controlling, by the second system, the screen of the electronic device to display a static preview image corresponding to the dynamic interface in response to the first system being switched to the second system.

In a second aspect, the present disclosure provides an electronic device including at least a first system, a second system, and a memory. One or more programs are stored in the memory. The one or more programs are configured to perform a display method according to the first aspect.

In a third aspect, the present disclosure provides a computer-readable storage medium configured to store program codes. The program codes are configured to be ran by a processor to execute a display method according to the first aspect.

BRIEF DESCRIPTION OF THE DRAWINGS

In order to more clearly illustrate the technical solutions in some embodiments of the present disclosure, the drawings that need to be used in the description of some embodiments are briefly introduced below. Obviously, the drawings in the following description are merely some embodiments of the present disclosure. For those skilled in the art, other drawings may be obtained based on these drawings without creative work.

DETAILED DESCRIPTION

In order to enable those skilled in the art to better understand technical solutions of the present disclosure, the technical solutions in some embodiments of the present disclosure are clearly and completely described below in conjunction with the drawings in some embodiments of the present disclosure.

As users have increasingly high demands for application experiences, requirements for various performance indicators of operating systems in smart devices also become higher. It becomes possible to install dual systems on smart devices. However, when electronic devices configured with dual systems are displaying, most of the electronic devices are implemented via big-cores, which consumes a large amount of power, resulting in poor battery life of the electronic devices and affecting user experience.

In some embodiments of the present disclosure, a first system may control a screen of an electronic device to display a dynamic interface, and in response to the first system being switched to a second system, the second system may control the screen of the electronic device to display a static preview image corresponding to the dynamic interface. Compared with the related art that interface data displayed by an electronic device is only implemented via a big-core system, a method mentioned above implements that the first system controls the screen of the electronic device to display the dynamic interface, and the second system controls the screen of the electronic device to only display the static preview image corresponding to the dynamic interface when a system in a running state is switched from the first system to the second system. By only displaying the static preview image corresponding to the dynamic interface, power consumption required for the electronic device to display interface data is saved, thereby prolonging the battery life of the electronic device and further improving user experience.

Therefore, in order to improve problems mentioned above, the present disclosure provides a display method and apparatus, an electronic device, and a storage medium, which may save the power consumption required for the electronic device to display interface data, thereby prolonging the battery life of the electronic device and further improving user experience.

Various embodiments of the present disclosure are described in detail below with reference to the accompanying drawings.

Figure 1:
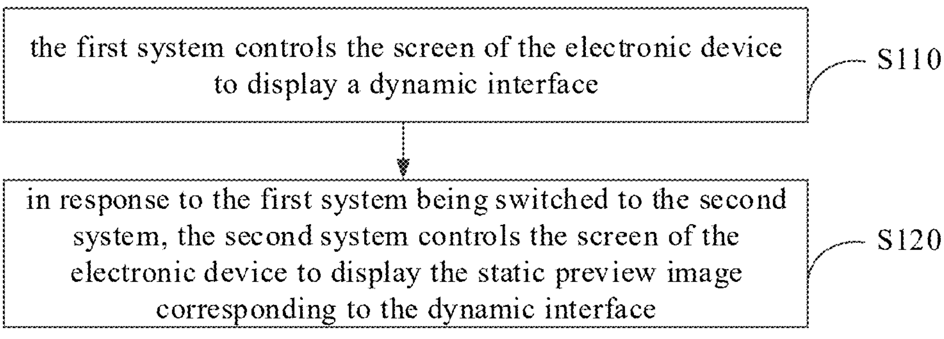
FIG. 1 is a schematic flow chart of a display method according to some embodiments of the present disclosure.

As shown in FIG. 1, FIG. 1 is a schematic flow chart of a display method according to some embodiments of the present disclosure. Some embodiments provide a display method that may be applied to an electronic device. The electronic device in some embodiments of the present disclosure includes at least a first processor and a second processor. The first processor is configured to run a first system, and the second processor is configured to run a second system. In some embodiments, the first processor may be understood as a big core, and the first system may be understood as a big core system in a dual system. The second processor may be understood as a small core, and the second system may be understood as a small core system in a dual system.

In some embodiments, the electronic device may be a mobile communication device with a network connection function such as a smart phone, a computer, a tablet, a smart TV, and etc. configured with a dual system. Alternatively, the electronic device may be a smart wearable device configured with a dual system, such as a smart watch, a smart bracelet, or other similar watch face devices configured with dual systems. The specific type of the electronic device may not be limited. The electronic device is configured with a display screen. The method may include operations executed by the following blocks.

At block S110, the first system controls the screen of the electronic device to display a dynamic interface.

In some embodiments of the present disclosure, power consumption of the first system is higher than power consumption of the second system. The first system and the second system are respectively configured with applications with different functions. The first system and the second system interact with each other (e.g., switch to each other) to complete functions of the electronic device.

In some embodiments, the first system may receive dynamic interface data in a running state, and send the dynamic interface data to the second system. The first system being in the running state may be understood as a system responsible for data processing is the first system (i.e., the first system is in an using state). The data processing may include processing at least one of application data and sensor data. Alternatively, the data processing may be understood that the first system is running in the foreground, and the first processor running the first system controls the display screen of the electronic device to display data.

In some embodiments, the dynamic interface represents an interface dynamically displayed on an interface of an electronic device. For example, the dynamic interface may be a watch face interface dynamically displaying expressions on a watch face of a smart watch, or a display interface dynamically displaying expressions on a display screen of a smart TV. The dynamic interface data includes data such as contents displayed on the dynamic interface.

In some embodiments, the first system in the running state may receive dynamic interface data sent by a specified application. The dynamic interface data may be packaged and sent by the specified application. The specified application may be a health data management application. The type of the specified application may not be limited herein.

Figure 2:
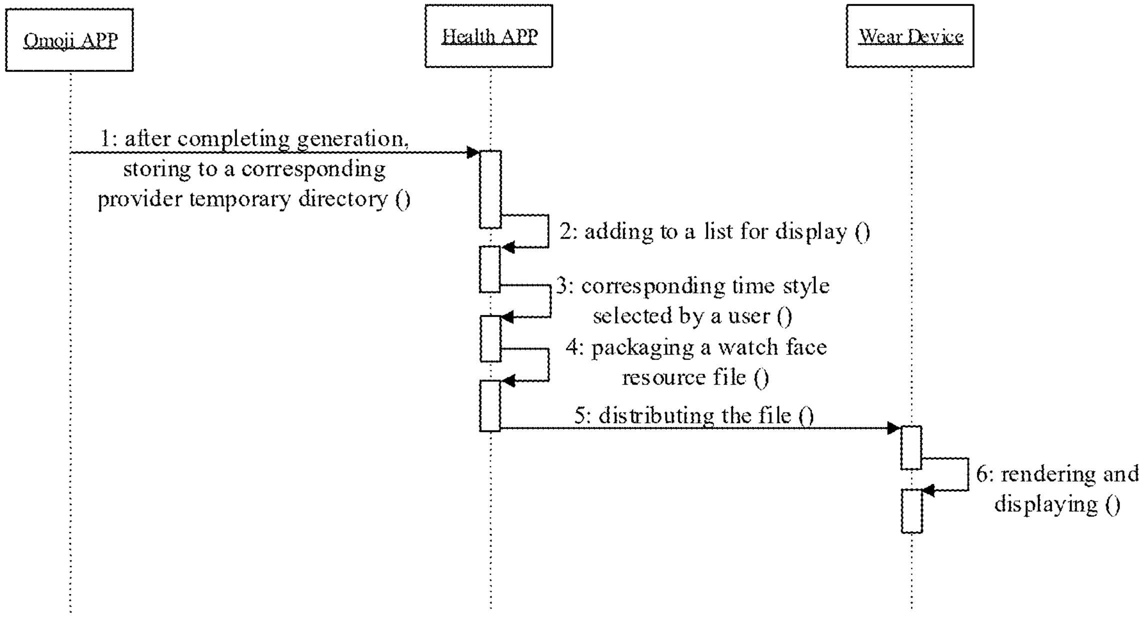
FIG. 2 is a schematic timing diagram of data interaction between an electronic device and a specified application according to some embodiments of the present disclosure.
Figure 3:
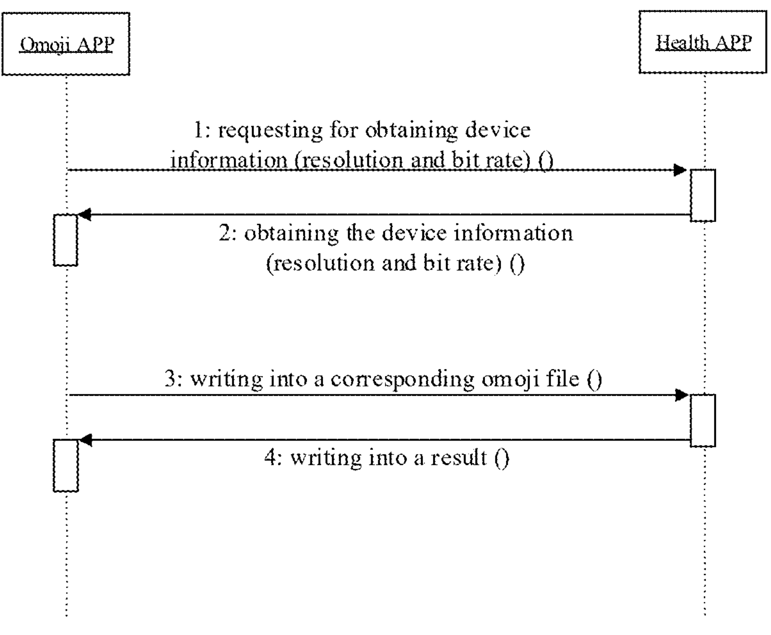
FIG. 3 is another schematic timing diagram of data interaction between an electronic device and a specified application according to some embodiments of the present disclosure.

In some application scenarios, as shown in FIG. 2, FIG. 2 is a schematic timing diagram of data interaction between an electronic device and a specified application according to some embodiments of the present disclosure. As shown in FIG. 2, assuming that the electronic device is a smart wearable device (i.e., Wear Device shown in FIG. 2). The smart wearable device communicates with a mobile phone. The mobile phone is configured with the specified application (e.g., Health APP shown in FIG. 2) and emoticon resource application (i.e., Omoji APP shown in FIG. 2). As shown in FIG. 3, the Omoji APP may obtain device information (e.g., resolution and bit rate shown in FIG. 3) of a connected device (i.e., the electronic device) provided by the Health APP via calling a getDeviceInfo ( ) method of a provider interface. The Omoji APP may generate corresponding required omoji expression resources based on the device information and place the omoji expression resources into a fileprovider directory. The Omoji APP may notify the Health APP to use the omoji expression resources via calling an addNewWfStyleRes ( ) method. The Health APP may copy the omoji expression resources to a device resource directory for style storage.

In some embodiments, if an exception occurs during a process of the style storage, the Health APP may return an error result to the Omoji APP. The Omoji APP may display the exception for prompting. After receiving the result returned by the Health APP, the Omoji APP may delete temporary file resources (i.e., the expression resources) stored in the fileprovider directory.

As shown in FIG. 2, after successfully adding new omoji expression resources, the Health APP may place the omoji expression resources into a temporary folder. The Health APP may list the omoji expression resources for storage (e.g., add the omoji expression resources to a database record style list). In the case that a time style (including multiple fonts, such as regular script, song typeface, boldface, etc.) selected by a user is matched, the Health APP may package and send a style file including descriptions of the time style to the smart wearable device. After receiving the style file, the smart wearable device may display the style file on a current watch face of the smart wearable device.

Figure 4:
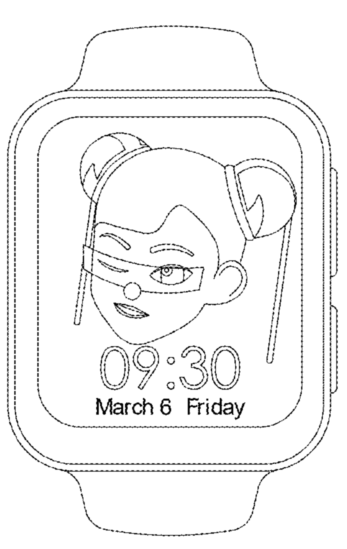
FIG. 4 is a schematic static effect diagram of a dynamic interface being displayed on a screen of an electronic device controlled by a first system according to some embodiments of the present disclosure.

In the case that the first system receives the dynamic interface data, the first system may control the screen of the electronic device to display the dynamic interface. The dynamic interface data may include a background and a dynamic expression. As shown in FIG. 4, the first system may control the screen of the electronic device to dynamically display an interface including the background and the dynamic expression. In some embodiments, both the background and the dynamic expression may be dynamically displayed, or only the expression may be dynamically displayed.

In some embodiments of the present disclosure, the first system may support dynamic display. In order to save power and increase the battery life, the second system is configured to support static display. For example, a format that the first system may support to display may be a jpg format, and a format that the second system may support to display may be a binary image format of rgb565. In this case, when sending the dynamic interface data to the second system, the first system may generate a static preview image corresponding to the dynamic interface based on the background and the dynamic expression, and send the static preview image to the second system. When generating the static preview image corresponding to the dynamic interface based on the background and the dynamic expression, the background may be used as a background image of the static preview image, and an expression content corresponding to the dynamic expression is superimposed on the background image to obtain the static preview image. By performing format conversion on the dynamic interface data before being sent to the second system, the static preview image corresponding to the dynamic interface may be possible to be quickly displayed without user's awareness when the system is switched, thereby improving user experience.

In some embodiments, for a same dynamic interface or a same static preview image, a number of backgrounds may be one or more, and dynamic expressions may be different dynamic expressions of a same face or may be different dynamic expressions of different faces.

In some application scenarios, as shown in FIG. 4, the background may include contents such as time (e.g., "09:30" shown in FIG. 4), date (e.g., "March 6" shown in FIG. 4), day of a week (e.g., "Friday" shown in FIG. 4), and etc. The specific display style of each content may not be limited. The display style includes a display font, a display format (e.g., a display format of year/month/day or month/day, etc.), a display position, and etc. The dynamic expressions may be different expressions corresponding to different cartoon characters.

At block S120, in response to the first system being switched to the second system, the second system controls the screen of the electronic device to display the static preview image corresponding to the dynamic interface.

In some embodiments, in the case that the system in the running state is switched from the first system to the second system, the second system may control the screen of the electronic device to display the static preview image corresponding to the dynamic interface. The static preview image corresponding to the dynamic interface represents a static image that displays a content the same as a content displayed on the dynamic interface.

It should be noted that, in some embodiments, the first system is ran by the first processor, and the second system is ran by the second processor. In some embodiments, in the case that the system in the running state is switched from the first system to the second system, the first processor may notify the second processor, and the second processor may execute to control the screen of the electronic device to display the static preview image corresponding to the dynamic interface.

It should be noted that, in some embodiments of the present disclosure, the processor may be a separate processing chip. In this case, the first processor and the second processor are each a separate processing chip. In some embodiments of the present disclosure, the processor may also be a processing core on an integrated chip. In this case, the first processor and the second processor may be understood as two processing cores on an integrated chip.

In the display method provided in some embodiments, the first system controls the screen of the electronic device to display the dynamic interface, and in response to the first system being switched to the second system, the second system controls the screen of the electronic device to display the static preview image corresponding to the dynamic interface. Compared with the related art that interface data displayed by an electronic device is only implemented via a big-core system, the solution implements that the first system controls the screen of the electronic device to display the dynamic interface, and the second system controls the screen of the electronic device to only display the static preview image corresponding to the dynamic interface when a system in a running state is switched from the first system to the second system. By only displaying the static preview image corresponding to the dynamic interface, power consumption required for the electronic device to display interface data is saved, thereby prolonging the battery life of the electronic device and further improving user experience.

Figure 5:
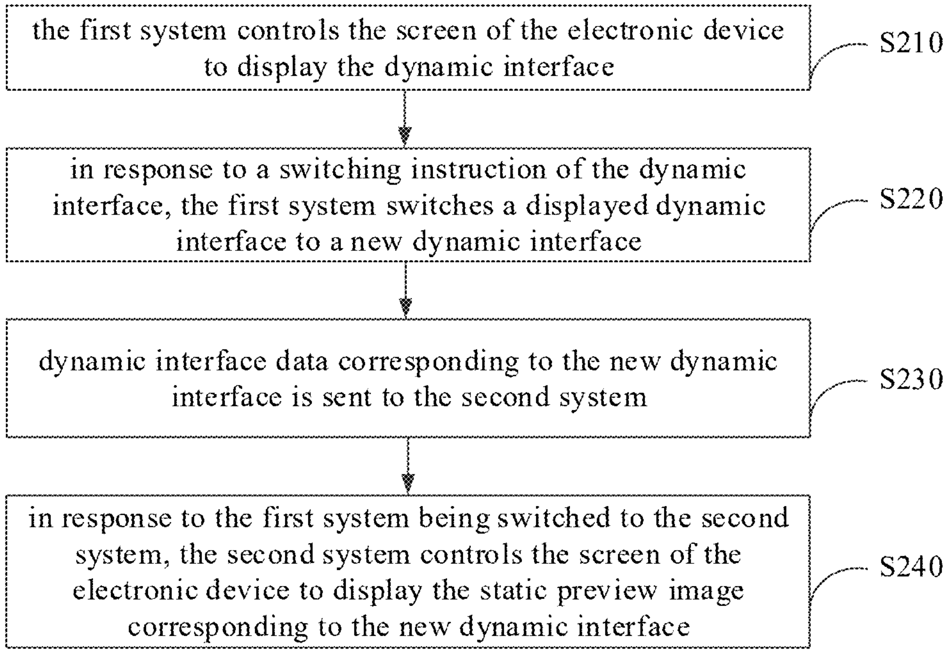
FIG. 5 is a schematic flow chart of a display method according to some embodiments of the present disclosure.

As shown in FIG. 5, FIG. 5 is a schematic flow chart of a display method according to some embodiments of the present disclosure. Some embodiments provide a display method that may be applied to the electronic device. The method may include operations executed by the following blocks.

At block S210, the first system controls the screen of the electronic device to display the dynamic interface.

The first system is in a dormant state (i.e., the second system is in the running state and the first system is in the dormant state) when the specified application mentioned above is sending the dynamic interface data to the first system. The second system may send a wake-up instruction to the first system in response to receiving a data receiving instruction. The first system may switch from the dormant state to the running state in response to the wake-up instruction.

In some embodiments, the data receiving instruction is generated by an external device before the external device sends the dynamic interface data to the electronic device. The data receiving instruction is configured to notify the second system that the electronic device needs to receive the dynamic interface data sent by the external device. As mentioned above, the external device may send the dynamic interface data to the electronic device through the configured specified application. The wake-up instruction is used by the second system to wake up the first system, and is configured to notify the first system that the electronic device needs to receive the dynamic interface data sent by the external device. The wake-up instruction may be generated and sent by the second system to the first system, or may be generated and sent directly by other sensors to the first system. The specific types of the sensors are not limited herein. It is only required that the sensors may detect that the electronic device needs to receive the dynamic interface data sent by the external device.

In some embodiments, when the first system is in the dormant state and the second system is in the running state, the second system may send the wake-up instruction to the first system to awake the first system. The first system may respond to the wake-up instruction, and switch from the dormant state to the running state. At this time, the second system may receive the dynamic interface data sent by the external device, and transparently transmit the dynamic interface data to the first system. In the case that dynamic interface data sent by the external device is new dynamic interface data, the second system may transparently transmit the new dynamic interface data to the first system.

At block S220, in response to a switching instruction of the dynamic interface, the first system switches a displayed dynamic interface to a new dynamic interface.

In some embodiments, the switching instruction of the dynamic interface is generated during a process when the first system controls the screen of the electronic device to display the dynamic interface. The switching instruction may be configured to randomly switch the dynamic interface among different contents. The contents may be understood as a dynamically changing subject. For example, a face of an expression watch face interface shown in FIG. 4 is switched to a face of an expression watch face interface shown in FIG. 6. The face of the expression watch face interface shown in FIG. 4 and the face of the expression watch face interface shown in FIG. 6 are different faces.

In some embodiments, during the process when the first system controls the screen of the electronic device to display the dynamic interface, in the case that a touch operation acting on the screen of the electronic device is obtained, the switching instruction of the dynamic interface may be generated. In response to the switching instruction of the dynamic interface, the first system may switch the displayed dynamic interface to the new dynamic interface.

Figure 6:
FIG. 6 is a schematic diagram of a displayed dynamic interface switched to a new dynamic interface by a first system according to some embodiments of the present disclosure.

In some application scenarios, as shown in FIG. 6, FIG. 6 is a schematic diagram of a displayed dynamic interface switched to a new dynamic interface by a first system according to some embodiments of the present disclosure. Assuming that a dynamic interface shown in FIG. 4 is a first dynamic interface displayed on the screen of the electronic device. In response to the switching instruction of the dynamic interface, the first system may switch the dynamic interface shown in FIG. 4 to a dynamic interface shown in FIG. 6. Compared to the dynamic interface shown in FIG. 4, FIG. 6 shows a new dynamic interface.

At block S230, dynamic interface data corresponding to the new dynamic interface is sent to the second system.

In the case that the displayed dynamic interface is switched to the new dynamic interface, the first system may send/synchronize the dynamic interface data corresponding to the new dynamic interface to the second system. In this way, the second system may obtain current expression watch face data of the electronic device in time, thereby ensuring consistency of information.

In some embodiments, before sending the dynamic interface data corresponding to the new dynamic interface to the second system, the first system may convert the new dynamic interface into a corresponding static preview image. For specific implementations of conversion, references may be made to the descriptions in the embodiments mentioned above, and details are not be repeated here.

At block S240, in response to the first system being switched to the second system, the second system controls the screen of the electronic device to display the static preview image corresponding to the new dynamic interface.

After the first system switches the displayed dynamic interface to the new dynamic interface, and sends the dynamic interface data corresponding to the new dynamic interface to the second system, the second system may control the screen of the electronic device to display the static preview image corresponding to the new dynamic interface. For specific implementations of the process, references may be made to relevant descriptions in the embodiments mentioned above, and details are not repeated here.

In some embodiments, in the case that a duration of the screen of the electronic device has been in an off-screen state for a preset duration, system switching may be triggered. For example, the system in the running state may be triggered to switch from the first system to the second system, or the system in the running state may be triggered to switch from the second system to the first system. The value of the preset duration may not be limited. For example, the value of the preset duration may be 10 seconds, 15 seconds, 20 seconds, 30 seconds, or other values.

In some embodiments, it is possible to detect the duration of the screen of the electronic device having been in the off-screen state in real time. When it is detected that the duration of the screen of the electronic device has been in the off-screen state for the preset duration, the system in the running state may be triggered to switch from the first system to the second system.

In some embodiments, when it is detected that the duration of the screen of the electronic device has been in the off-screen state for the preset duration, and a screen state of the electronic device is switched from the off-screen state to an on-screen state, the system in the running state may be triggered to switch from the first system to the second system.

In some embodiments, when it is detected that the duration of the screen of the electronic device has been in the off-screen state for the preset duration, and it is detected that the user switches the screen state of the electronic device from the off-screen state to the on-screen state by touching a specific function key of the electronic device, the system in the running state is triggered to switch from the first system to the second system. The specific function key may include an on/off key or a home key of the electronic device.

In some embodiments, in the case that it is pre-set that when a message notification from a specific application is received, the screen is triggered to switch from the off-screen state to the on-screen state, when it is detected that the duration of the screen of the electronic device has being in the off-screen state for the preset duration, and it is detected that the message notification from the specific application is received, the system in the running state is triggered to switch from the first system to the second system. The specific application may include an instant messaging application, and the message notification of the specific application may be a message notification of the instant messaging application, or an incoming phone call, and etc.

In the display method provided by some embodiments, the first system controls the screen of the electronic device to display the dynamic interface, and switches the displayed dynamic interface to the new dynamic interface in response to the switching instruction of the dynamic interface. The first system sends the dynamic interface data corresponding to the new dynamic interface to the second system. In response to the first system being switched to the second system, the second system controls the screen of the electronic device to display the static preview image corresponding to the new dynamic interface. The solution realizes that the first system controls the screen of the electronic device to display the dynamic interface, and when the system in the running state is switched from the first system to the second system, the second system controls the screen of the electronic device to only display the static preview image corresponding to the dynamic interface. By only displaying the static preview image corresponding to the dynamic interface, the power consumption required for the electronic device to display the interface data is saved, thereby prolonging the battery life of the electronic device and further improving user experience. When the dynamically displayed interface changes during the operation of the first system, the static preview image corresponding to a changed dynamic interface is sent to the second system. In this way, the first system and the second system may display consistent information in their display support ways respectively, thereby improving user experience.

Figure 7:
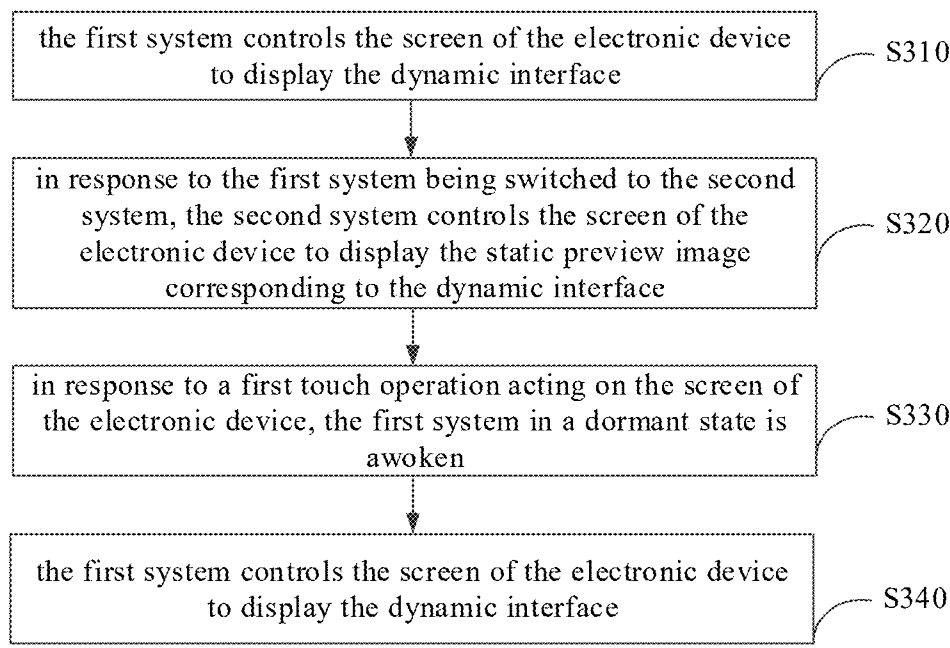
FIG. 7 is a schematic flow chart of a display method according to some embodiments of the present disclosure.

As shown in FIG. 7, FIG. 7 is a schematic flow chart of a display method according to some embodiments of the present disclosure. Some embodiments provide a display method that may be applied to the electronic device. The method may include operations executed by the following blocks.

At block S310, the first system controls the screen of the electronic device to display the dynamic interface.

At block S320, in response to the first system being switched to the second system, the second system controls the screen of the electronic device to display the static preview image corresponding to the dynamic interface.

At block S330, in response to a first touch operation acting on the screen of the electronic device, the first system in a dormant state is awoken.

In some embodiments, the first touch operation may be configured to trigger and awake the first system in the dormant state. The first touch operation may be a click operation, a tap operation, a key (may be a virtual key) operation, or a slide/slip operation. The specific type of the first touch operation may not be limited.

In some embodiments, in the case that the electronic device is a smart watch, when the first system is in the dormant state, if the user clicks on a watch face interface of the smart watch, in response to the first touch operation acting on the screen of the electronic device, the first system may be triggered to switch from the dormant state to a wake-up state.

It should be noted that, when the first system is in the dormant state, the first processor is in a background running state. When the first system is switched from the dormant state to the wake-up state, the first processor may be switched from the dormant state to the wake-up state. The first processor may control the display screen of the electronic device to display data. Alternatively, the first processor may not control the display screen of the electronic device to display data. Alternatively, only when the first system is in the running state, the first processing may control the display screen of the electronic device to display data.

At block S340, the first system controls the screen of the electronic device to display the dynamic interface.

In some embodiments, when the first system switches from the dormant state to the wake-up state, in the case that the first processor is able to control the display screen of the electronic device to display data, the first system (i.e., the first processor) may control the screen of the electronic device to display the dynamic interface again. It should be noted that, if the dynamic interface displayed on the screen of the electronic device does not change during the process when the first system controls to the screen of the electronic device to display the dynamic interface for the first time, the dynamic interface displayed on the screen of the electronic device when the first system controls again may be a previous dynamic interface. If the dynamic interface displayed on the screen of the electronic device changes during the process when the first system controls to the screen of the electronic device to display the dynamic interface for the first time, the dynamic interface displayed on the screen of the electronic device when the first system controls again may be a changed dynamic interface.

In some embodiments, during the process when the first system controls the screen of the electronic device to display the dynamic interface, in the case that a second touch operation acts on the screen of the electronic device, in response to the second touch operation acting on the screen of the electronic device, the first system may control the screen of the electronic device to switch and display different dynamic interfaces. The different dynamic interfaces represent dynamic interfaces with different contents. That is, the first system controls the screen of the electronic device to randomly switch and display different dynamic interfaces. The different dynamic interfaces may also be understood as the new dynamic interface described in the embodiments mentioned above. It should be noted that, during the process when the first system controls the screen of the electronic device to display the dynamic interface for the first time, when there is a touch operation acting on the screen of the electronic device, the first system may also control the screen of the electronic device to randomly switch and display different dynamic interfaces.

Figure 8:
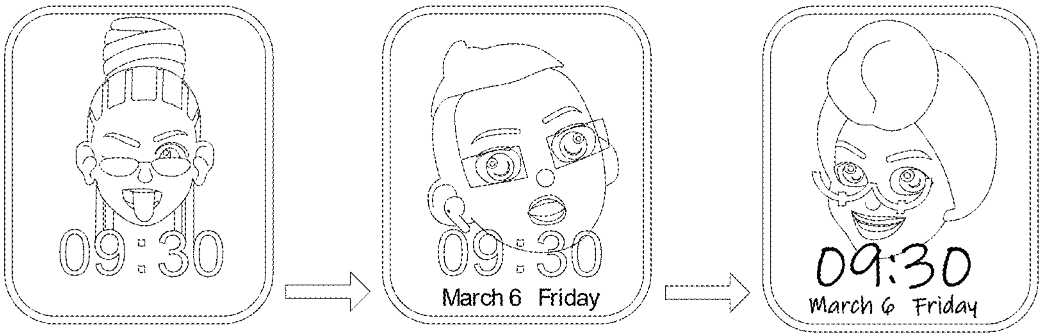
FIG. 8 is a schematic diagram of a screen of an electronic device controlled to switch and display different dynamic interfaces by a first system in response to a second touch operation acting on the screen of the electronic device according to some embodiments of the present disclosure.

In some application scenarios, as shown in FIG. 8, FIG. 8 is a schematic diagram of a screen of an electronic device controlled to switch and display different dynamic interfaces by a first system in response to a second touch operation acting on the screen of the electronic device according to some embodiments of the present disclosure. As shown in FIG. 8, assuming that the screen of the electronic device initially displays the dynamic interface shown in FIG. 4, in the case where it is determined that there is a second touch operation action on the screen of the electronic device, the dynamic interface shown in FIG. 4 may be switched to a dynamic interface shown in a leftmost image of FIG. 8. In some embodiments, if the user clicks on the screen of the electronic device again, the dynamic interface shown in the leftmost image of FIG. 8 may be switched to a dynamic interface shown in a middle image of FIG. 8. If the user clicks on the screen of the electronic device again, the dynamic interface shown in the middle image of FIG. 8 may be switched to a dynamic interface shown in a rightmost image of FIG. 8.

In the display method provided in some embodiments, the first system controls the screen of the electronic device to display the dynamic interface, and in response to the first system being switched to the second system, the second system controls the screen of the electronic device to display the static preview image corresponding to the dynamic interface. In response to the first touch operation acting on the screen of the electronic device, the first system in the dormant state is awoken. The first system controls the screen of the electronic device to display the dynamic interface. The solution realizes flexible control of the screen of the electronic device to display the dynamic interface, and improves the flexibility and interestingness of the display control of the electronic device by controlling the screen of the electronic device to switch and display different dynamic interfaces.

Figure 9:
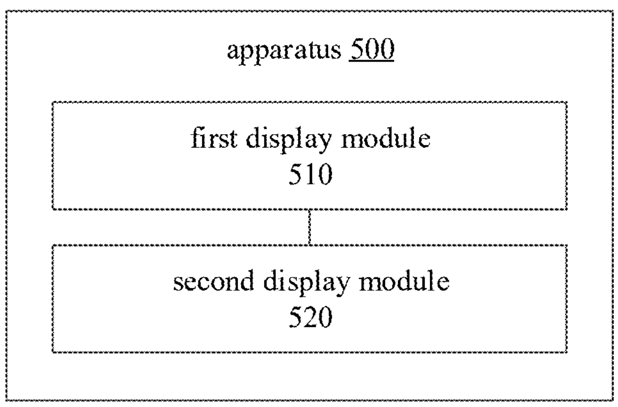
FIG. 9 is a schematic structural block view of a display apparatus according to some embodiments of the present disclosure.

As shown in FIG. 9, FIG. 9 is a schematic structural block view of a display apparatus according to some embodiments of the present disclosure. A display apparatus 500 provided in some embodiments may run on an electronic device. The electronic device includes at least a first processor and a second processor. The first processor is configured to run a first system, and the second processor is configured to run a second system. The apparatus 500 includes a first display module 510 and a second display module 520.

The first display module 510 is configured for the first system to control a screen of the electronic device to display a dynamic interface.

In some embodiments, the apparatus 500 may further include a data receiving module, configured for the first system to receive dynamic interface data and send the dynamic interface data to the second system. The dynamic interface data includes a background and a dynamic expression. The sending the dynamic interface data to the second system includes generating a static preview image corresponding to the dynamic interface based on the background and the dynamic expression and sending the static preview image to the second system.

In some embodiments, the apparatus 500 may further include a wake-up module, configured for the second system to send a wake-up instruction to the first system in response to receiving a data receiving instruction before the first system receives the dynamic interface data, and for the first system to switch from a dormant state to a running state in response to the wake-up instruction.

In some embodiments, the apparatus 500 may further include a display switching module, configured for the first system to switch a displayed dynamic interface to a new dynamic interface in response to a switching instruction of the dynamic interface, and to send dynamic interface data corresponding to the new dynamic interface to the second system.

In some embodiments, the apparatus 500 may further include a system switching module, configured to switch the first system to the second system in response to a duration of the screen of the electronic device having been in an off-screen state for a preset duration.

The second display module 520 is configured for the second system to control the screen of the electronic device to display the static preview image corresponding to the dynamic interface in response to the first system being switched to the second system.

In some embodiments, after the second system controls the screen of the electronic device to display the static preview image corresponding to the dynamic interface, the wake-up module may also be configured to awake the first system in the dormant state in response to a first touch operation acting on the screen of the electronic device. After that, the first system controls the screen of the electronic device to display the dynamic interface. The first system controlling the screen of the electronic device to display the dynamic interface includes controlling the screen of the electronic device to switch and display different dynamic interfaces in response to a second touch operation acting on the screen of the electronic device.

Those skilled in the art can clearly understand that, for the convenience and brevity of description, the specific working processes of apparatuses and modules described above may refer to corresponding processes in method embodiments mentioned above and will not be repeated here.

In several embodiments provided in the present disclosure, couplings between the modules may be electrical, mechanical, or other forms.

In addition, in each of the embodiments of the present disclosure, each functional module may be integrated into a processing module, each module may exist separately physically, or two or more modules may be integrated into a module. The integrated modules mentioned above may be implemented either in a form of hardware or in a form of software function modules.

Figure 10:
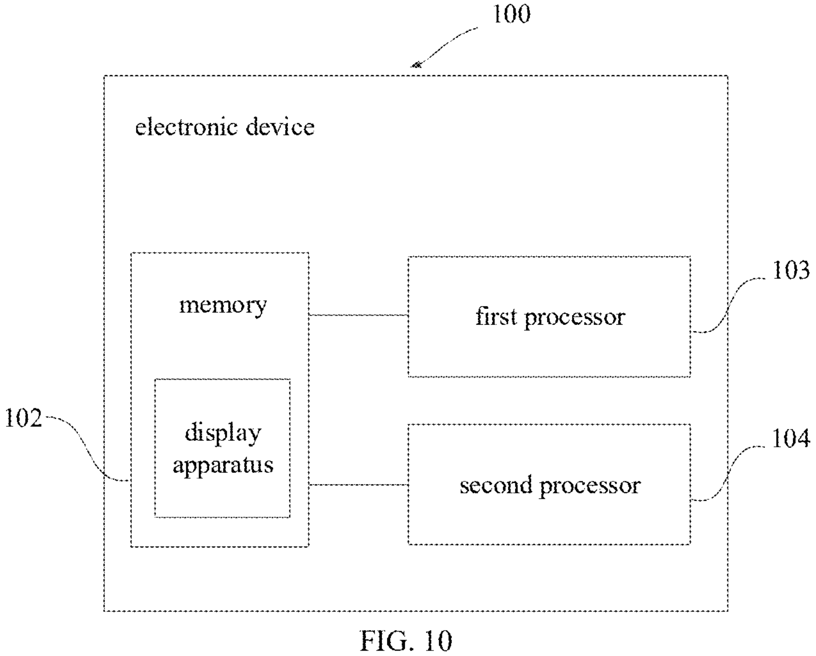
FIG. 10 is a schematic structural block view of an electronic device according to some embodiments of the present disclosure.

As shown in FIG. 10, based on the display method and apparatus mentioned above, some embodiments of the present disclosure also provide an electronic device 100 capable of performing the display method mentioned above. The electronic device 100 includes at least a memory 102, a first processor 103, and a second processor 104. The first processor 103 and the second processor 104 are coupled to each other. The memory 102 is connected to both the first processor 103 and the second processor 104 by communication lines. The memory 102 stores programs that may execute the methods in the embodiments mentioned above. The first processor 103 or the second processor 104 may execute the programs stored in the memory 102. In some embodiments, the first processor 103 and the second processor 104 may be connected to different memories (not shown).

In some embodiments, the first processor 103 or the second processor 104 may include one or more processing cores. The first processor 103 or the second processor 104 uses various interfaces and lines to connect various parts in the entire electronic device 100. The first processor 103 or the second processor 104 executes various functions of the electronic device 100 and processes data by running or executing instructions, programs, code sets, or instruction sets stored in the memory 102, and calling data stored in the memory 102. In some embodiments, the first processor 103 or the second processor 104 may be implemented in at least one of the following hardware forms: digital signal processing (DSP), field-programmable gate array (FPGA), programmable logic array (PLA). The first processor 103 or the second processor 104 may integrate one or a combination of several of a central processing unit (CPU), a graphics processing unit (GPU), a modem, and etc. The CPU is mainly configured to handle an operating system, user interfaces, applications, and etc. The GPU is configured to render and draw displayed contents. The modem is configured to handle wireless communication. It can be understood that the modem mentioned above may not be integrated into the first processor 103 or the second processor 104, but may be implemented by a separate communication chip.

The memory 102 may include a random access memory (RAM), or may also include a read-only memory. The memory 102 may be configured to store instructions, programs, codes, code sets, or instruction sets. For example, a display apparatus may be stored in the memory 102. The display apparatus may be the display apparatus 500 mentioned above. The memory 102 may include a program storage area and a data storage area. The program storage area may store instructions for implementing an operating system, instructions for implementing at least one function (e.g., a touch function, a sound playback function, an image playback function, and etc.), instructions for realizing the embodiments mentioned above, and etc. The storage data area may store data created during use of the electronic device 100 (e.g., phone books, audio and video data, chat record data) and etc.

Figure 11:
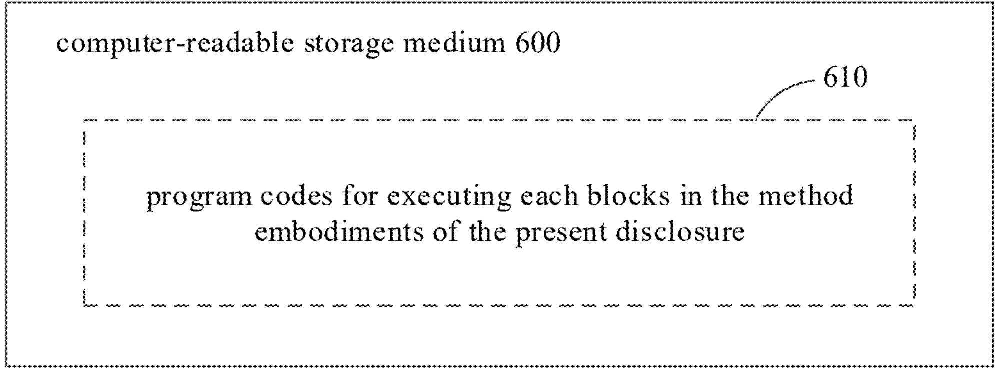
FIG. 11 is a schematic structural block view of a computer-readable storage medium configured to store or carry program codes for implementing a display method in some embodiments of the present disclosure according to some embodiments of the present disclosure.

As shown in FIG. 11, FIG. 11 is a schematic structural block view of a computer-readable storage medium according to some embodiments of the present disclosure. The computer-readable storage medium 600 is configured to store program codes. The program codes may be called by a processor to execute the methods described in the method embodiments mentioned above.

The computer-readable storage medium 600 may be an electronic memory such as flash memory, electrically erasable programmable read-only memory (EEPROM), erasable programmable read-only memory (EPROM), hard disk, or read-only memory (ROM). In some embodiments, the computer-readable storage medium 600 includes a non-transitory computer-readable storage medium. The computer-readable storage medium 600 has a storage space for storing program codes 610 for executing any blocks in the methods mentioned above. The program codes may be read from one or more computer program products or be written into one or more computer program products. The program codes 610 may be compressed in a suitable way.

In conclusion, some embodiments of the present disclosure provide the display method and apparatus, the electronic device, and the storage medium. The first system controls the screen of the electronic device to display the dynamic interface, and in response to the first system being switched to the second system, the second system controls the screen of the electronic device to display the static preview image corresponding to the dynamic interface. Compared with the related art that interface data displayed by an electronic device is only implemented via a big-core system, the solution implements that the first system controls the screen of the electronic device to display the dynamic interface, and the second system controls the screen of the electronic device to only display the static preview image corresponding to the dynamic interface when a system in a running state is switched from the first system to the second system. By only displaying the static preview image corresponding to the dynamic interface, power consumption required for the electronic device to display interface data is saved, thereby prolonging the battery life of the electronic device and further improving user experience.

Finally, it should be noted that, the above embodiments are only used to illustrate the technical solutions of the present disclosure, but not to limit them. Although the present disclosure has been described in detail with reference to the embodiments mentioned above, those of ordinary skill in the art should understand that they can modify the technical solutions described in the embodiments mentioned above, or make equivalent replacements for some of the technical features herein. These modifications or replacements do not cause the essence of the corresponding technical solutions to deviate from the spirit and scope of the technical solutions of the various embodiments of the present disclosure.

What is claimed is:

1. A display method, applied to an electronic device, the electronic device comprising a first system and a second system, and the method comprising:

controlling, by the first system, a screen of the electronic device to display a dynamic interface;

controlling, by the second system, the screen of the electronic device to display a static preview image corresponding to the dynamic interface in response to the first system being switched to the second system;

receiving, by the first system, dynamic interface data, wherein the dynamic interface data comprises a background and a dynamic expression;

generating, by the first system, the static preview image corresponding to the dynamic interface based on the background and the dynamic expression; and sending, by the first system, the static preview image to the second system.

2. The method according to claim 1, wherein the generating the static preview image corresponding to the dynamic interface based on the background and the dynamic expression, comprises:

obtaining the static preview image by using the background as a background image of the static preview image and superimposing an expression content corresponding to the dynamic expression on the background image.

3. The method according to claim 1, further comprising:

sending, by the second system, a wake-up instruction to the first system in response to receiving a data receiving instruction; and switching, by the first system, from a hibernating state to a running state in response to the wake-up instruction.

4. The method according to claim 3, further comprising:

receiving, by the second system, dynamic interface data sent by an external device; and transmitting, by the second system, the dynamic interface data to the first system transparently.

5. The method according to claim 1, further comprising:

switching, by the first system, a displayed dynamic interface to a new dynamic interface in response to a switching instruction of the dynamic interface; and sending, by the first system, dynamic interface data corresponding to the new dynamic interface to the second system.

6. The method according to claim 5, wherein the sending, by the first system, dynamic interface data corresponding to the new dynamic interface to the second system, comprises:

converting the new dynamic interface into a corresponding static preview image; and sending the corresponding static preview image to the second system.

7. The method according to claim 5, further comprising:

generating, in response to a touch operation acting on the screen of the electronic device, the switching instruction of the dynamic interface during a process when the first system controls the screen of the electronic device to display the dynamic interface.

8. The method according to claim 1, wherein the electronic device comprises a first processor and a second processor, the first processor is configured to run the first system and the second processor is configured to run the second system, and the controlling, by the second system, the screen of the electronic device to display a static preview image corresponding to the dynamic interface in response to the first system being switched to the second system, comprises:

notifying, by the first processor, the second processor to control the screen of the electronic device to display the static preview image corresponding to the dynamic interface in response to the first system being switched to the second system.

9. The method according to claim 1, further comprising:

switching, in response to a duration of the screen of the electronic device having been in an off-screen state for a preset duration, the first system to the second system; or, switching, in response to a duration of the screen of the electronic device having been in an off-screen state for a preset duration and the screen of the electronic device having been switched from the off-screen state to an on-screen state, the first system to the second system; or, switching, in response to a duration of the screen of the electronic device having been in an off-screen state for a preset duration and a message notification received from a specific application having been detected, the first system to the second system, wherein the message notification is configured for triggering the screen to switch from the off-screen state to an on-screen state; or, switching, in response to a duration of the screen of the electronic device having been in an off-screen state for a preset duration, the second system to the first system.

10. The method according to claim 1, further comprising:

awaking, in response to a first touch operation acting on the screen of the electronic device, the first system in a hibernating state; and controlling, by the first system, the screen of the electronic device to display the dynamic interface.

11. The method according to claim 10, wherein the controlling, by the first system, the screen of the electronic device to display the dynamic interface, comprises:

controlling, in response to a second touch operation acting on the screen of the electronic device, the screen of the electronic device to switch and display different dynamic interfaces.

12. The method according to claim 1, wherein power consumption of the first system is higher than power consumption of the second system.

13. An electronic device, comprising at least a first system, a second system, and a memory, wherein one or more programs are stored in the memory, the one or more programs are configured to perform a method, and the method comprises:

controlling, by the first system, a screen of the electronic device to display a dynamic interface; and controlling, by the second system, the screen of the electronic device to display a static preview image corresponding to the dynamic interface in response to the first system being switched to the second system;

receiving by the first system, dynamic interface data, wherein the dynamic interface data comprises a background and a dynamic expression;

generating, by the first system, the static preview image corresponding to the dynamic interface based on the background and the dynamic expression; and sending, by the first system, the static preview image to the second system.

14. The device according to claim 13, wherein the electronic device comprises a first processor and a second processor, the one or more programs are configured to be executed by the first processor or the second processor, and the controlling, by the second system, the screen of the electronic device to display a static preview image corresponding to the dynamic interface in response to the first system being switched to the second system, comprises:

notifying, by the first processor, the second processor to control the screen of the electronic device to display the static preview image corresponding to the dynamic interface in response to the first system being switched to the second system.

15. The device according to claim 13, wherein the method further comprises:

switching, in response to a duration of the screen of the electronic device having been in an off-screen state for a preset duration, the first system to the second system; or, switching, in response to a duration of the screen of the electronic device having been in an off-screen state for a preset duration and the screen of the electronic device having been switched from the off-screen state to an on-screen state, the first system to the second system; or switching, in response to a duration of the screen of the electronic device having been in an off-screen state for a preset duration and a message notification received from a specific application having been detected, the first system to the second system, wherein the message notification is configured for triggering the screen to switch from the off-screen state to an on-screen state; or, switching, in response to a duration of the screen of the electronic device having been in an off-screen state for a preset duration, the second system to the first system.

16. A non-transitory computer-readable storage medium, configured to store program codes, wherein the program codes are configured to be ran by a processor to execute a method, and the method comprises:

controlling, by a first system, a screen of the electronic device to display a dynamic interface; and controlling, by a second system, the screen of the electronic device to display a static preview image corresponding to the dynamic interface in response to the first system being switched to the second system;

receiving, by the first system, dynamic interface data, wherein the dynamic interface data comprises a background and a dynamic expression;

generating, by the first system, the static preview image corresponding to the dynamic interface based on the background and the dynamic expression; and sending, by the first system, the static preview image to the second system.

* * * * *